United States Patent

Nagarajan et al.

(10) Patent No.: US 9,419,742 B2
(45) Date of Patent: Aug. 16, 2016

(54) OPTICAL COMMUNICATION SYSTEM HAVING TUNABLE SOURCES

(75) Inventors: Radhakrishnan L. Nagarajan, Cupertino, CA (US); Masaki Kato, Palo Alto, CA (US); Michael Francis Van Leeuwen, Bethesda, MD (US); Timothy Butrie, Hellertown, PA (US)

(73) Assignee: Infinera Corporation, Sunnyvale, CA (US)

( * ) Notice: Subject to any disclaimer, the term of this patent is extended or adjusted under 35 U.S.C. 154(b) by 225 days.

(21) Appl. No.: 13/340,982

(22) Filed: Dec. 30, 2011

(65) Prior Publication Data

US 2013/0170787 A1 Jul. 4, 2013

(51) Int. Cl.
G02B 6/12 (2006.01)
H04J 14/02 (2006.01)
H04B 10/50 (2013.01)

(52) U.S. Cl.
CPC ......... H04J 14/0254 (2013.01); G02B 6/12019 (2013.01); H04B 10/506 (2013.01)

(58) Field of Classification Search
None
See application file for complete search history.

(56) References Cited

U.S. PATENT DOCUMENTS

| | | | | |
|---|---|---|---|---|
| 5,894,362 A * | 4/1999 | Onaka et al. | | 398/95 |
| 6,055,078 A * | 4/2000 | Chen et al. | | 398/79 |
| 6,061,158 A * | 5/2000 | DeLong | | 398/196 |
| 6,369,923 B1 * | 4/2002 | Kuo et al. | | 398/91 |
| 7,133,586 B2 * | 11/2006 | Yegnanarayanan et al. | | 385/14 |
| 7,734,126 B2 * | 6/2010 | Kershteyn et al. | | 385/14 |
| 2005/0129350 A1 * | 6/2005 | Welch et al. | | 385/14 |
| 2009/0202196 A1 * | 8/2009 | Kish et al. | | 385/14 |
| 2010/0247036 A1 * | 9/2010 | Little | | 385/28 |

* cited by examiner

*Primary Examiner* — Tina Wong
(74) *Attorney, Agent, or Firm* — Harrity & Harrity LLP; David L. Soltz

(57) ABSTRACT

Consistent with one example of the disclosed implementations, a photonic integrated circuit (PIC) may be provided that includes s group of lasers and an arrayed waveguide grating (AWG) disposed on a substrate. Each laser in the group may supply an optical signal, such that each optical signal has a different wavelength. Each laser may be tunable to at least two designated wavelengths, which are separated from one another by a free spectral range (FSR) of the AWG. As a result, the optical signals provided from each laser may be combined by the AWG, regardless of which designated wavelength the optical signals have. Accordingly, a PIC may be provided that has a relatively simple construction but can supply optical signals having tunable wavelengths.

26 Claims, 12 Drawing Sheets

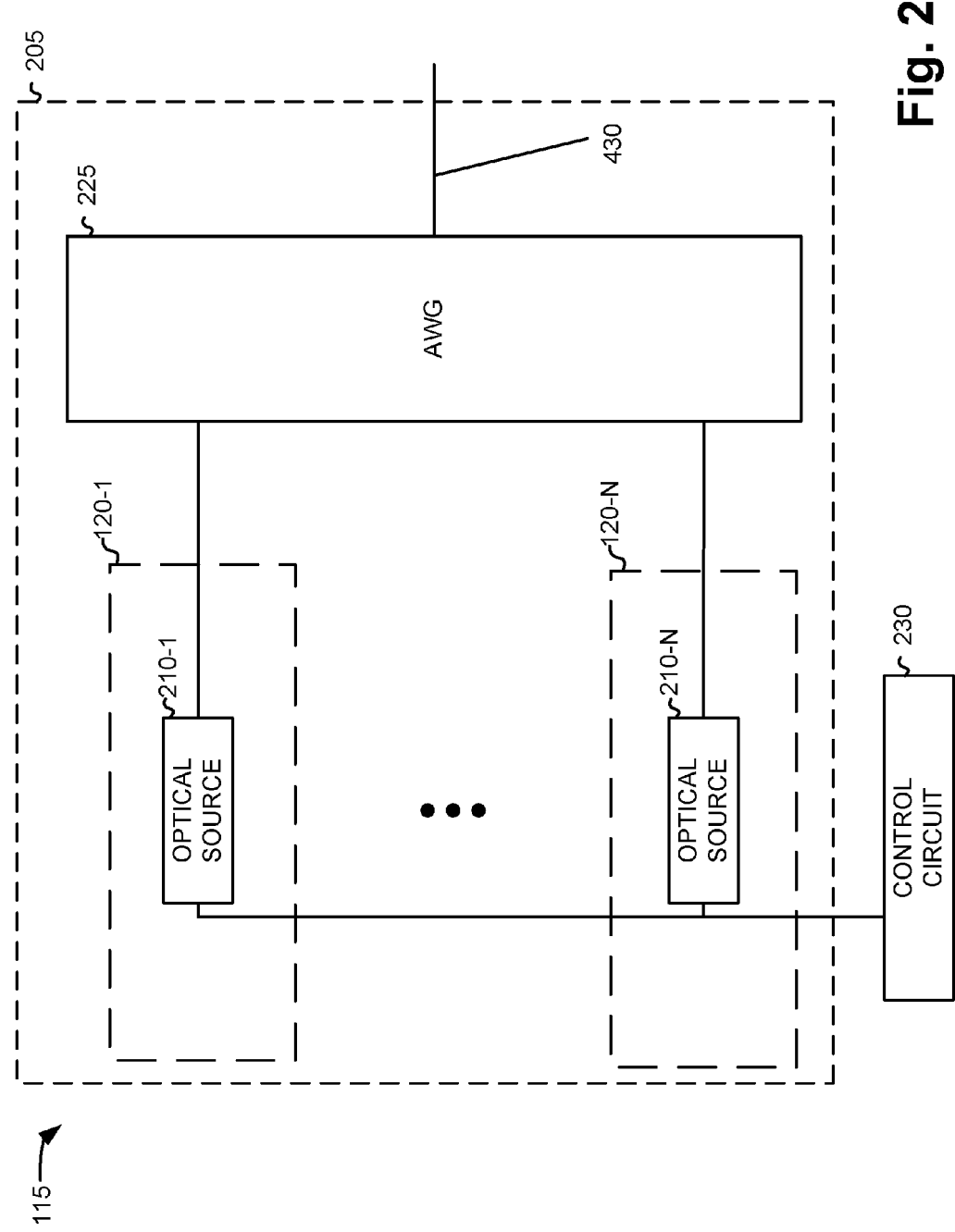

OPTICAL COMMUNICATION SYSTEM HAVING TUNABLE SOURCES

BACKGROUND

Wavelength division multiplexed (WDM) optical communication systems are known in which multiple modulated optical signals, each having a different wavelength, are transmitted on a common optical communication path. The wavelengths of such optical signals are often in a so-called "C-band," i.e., within a range of 1530 nm to 1565 nm. The C-band corresponds to a low loss window or range of silica based optical fibers. The optical signal wavelengths often conform to a grid, in which each wavelength is spectrally spaced from one another by a uniform spectral spacing, such as 25 GHz.

WDM optical communication systems often include optical transmitters, which output the optical signals, and an optical combiner, which combines the optical signals into a WDM optical signal that is supplied to one end of an optical communication path. At the receive end of the optical communication path, the optical signals may be demultiplexed and supplied to corresponding optical receivers.

In many WDM optical communication systems, the optical transmitters, as well as the optical combiner, are provided as discrete components.

Photonic integrated circuits (PICs), however, are known in which the transmitters and the optical combiner are provided or integrated on a common substrate. The light from each transmitter, which may include a semiconductor laser, may be separately modulated to carry a corresponding data stream and combined by the optical combiner to provide the wavelength division multiplexed (WDM) optical signal. PIC-based optical communication systems may have improved reliability and reduced cost compared to systems including discrete transmitter and combiner components.

PICs have been deployed where the wavelengths of the light supplied from each laser is substantially fixed. Accordingly, specific PICs may be required to provide optical signals having specific wavelengths. As a result, a first PIC is fabricated to supply optical signals having first wavelengths for use in a particular network implementation, while a second PIC must be fabricated to supply optical signals having second wavelengths for use in a different network implementation. Manufacturing costs are therefore increased.

SUMMARY

According to one aspect, an apparatus may include a first optical source configured to selectively supply a first optical signal having a first wavelength or a second optical signal having a second wavelength. A second optical source is also provided that is configured to selectively supply one of a third optical signal having a third wavelength or a fourth optical signal having a fourth wavelength. An arrayed waveguide grating is also provide that has input waveguides, a first dielectric slab, a second dielectric slab, intermediate waveguides extending between the first and second dielectric slabs, and an output waveguide. One of the input waveguides having associated first and second passbands, the first passband being spectrally spaced from the second passband. The first passband includes the first wavelength and the second passband includes the second wavelength, and a second one of the input waveguides has associated third and fourth passbands, the third passband being spectrally spaced from the fourth passband, the third passband including the third wavelength and the fourth passband including the fourth wavelength. The apparatus may further include a control circuit to: tune the first optical source to supply the first optical signal and tune the second optical source to supply the third optical signal; or tune the first optical source to supply the second optical signal and the second optical source to supply the fourth optical signal.

According to another aspect, an apparatus may include a substrate, and an arrayed waveguide grating provided on the substrate. The arrayed waveguide grating has input waveguides, intermediate waveguides, and an output waveguide. The arrayed waveguide grating is associated with a quantity of free spectral ranges (FSRs) at which the arrayed waveguide grating passes optical signals at the input waveguides to the output waveguide. The apparatus may also include optical sources provided on the substrate. Each of the optical sources is connected to a corresponding one of the input waveguides of the arrayed waveguide grating, and each of the optical sources supplies a corresponding selectable one of a number of optical signals, where each of the optical signals, from a particular one of the optical sources, is spaced from one another by a frequency corresponding to FSRs associated with the arrayed waveguide grating. Further, a control circuit is provided to selectively control the optical sources to supply optical signals in a selected one of the FSRs.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 2 is a diagram illustrating an example of components of an optical transmitter;

DETAILED DESCRIPTION

The following detailed description refers to the accompanying drawings. The same reference numbers in different drawings may identify the same or similar elements.

Consistent with one example of the disclosed implementations, a photonic integrated circuit (PIC) may be provided that includes s group of lasers and an arrayed waveguide grating (AWG) disposed on a substrate. Each laser in the group may supply an optical signal, such that each optical signal has a different wavelength. Each laser may be tunable to at least two designated wavelengths, which are separated from one another by a free spectral range (FSR) of the AWG. As a result, the optical signals provided from each laser may be combined by the AWG, regardless of which designated wavelength the optical signals have. Accordingly, a PIC may be provided that has a relatively simple construction but can supply optical signals having tunable wavelengths.

Figure 1:
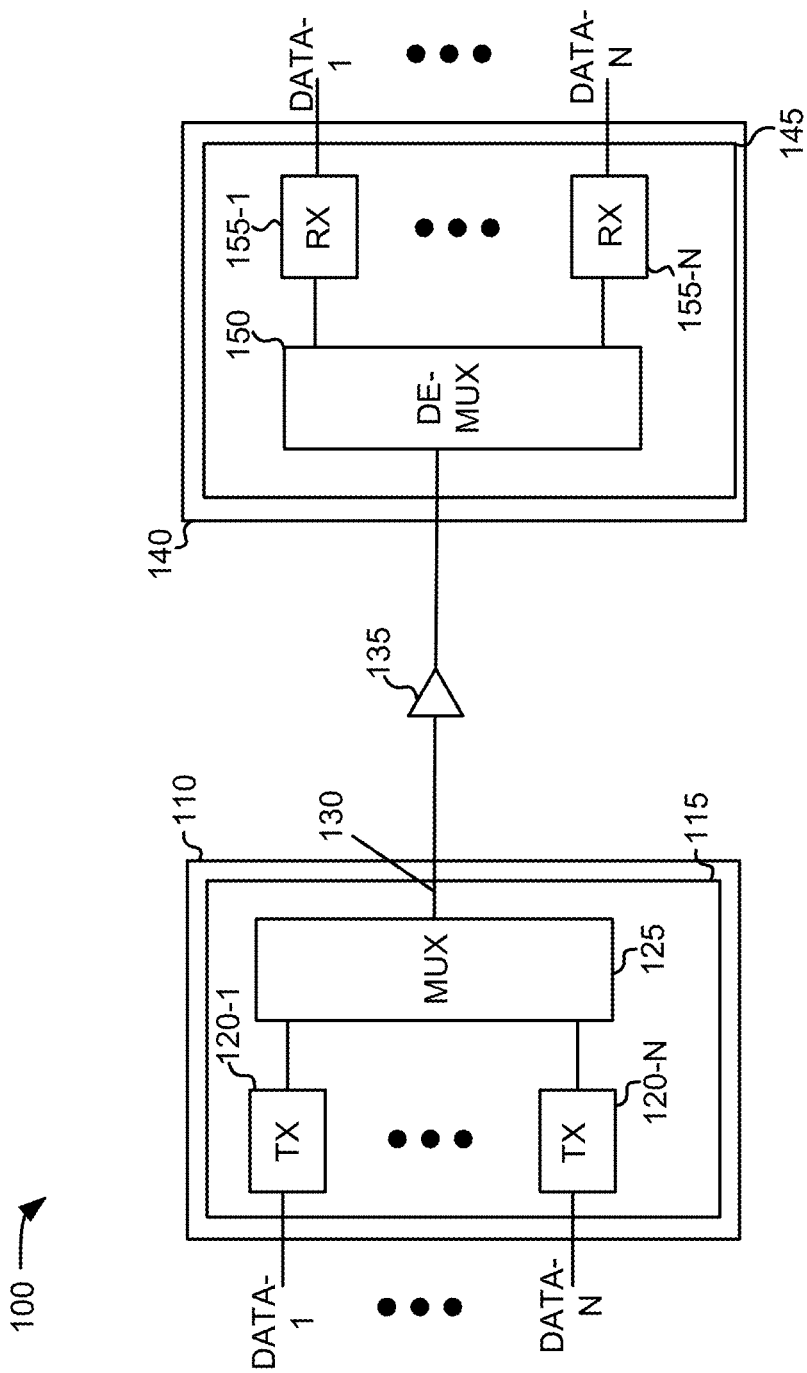
FIG. 1 is a diagram that conceptually illustrates components of an example optical communication system.

FIG. 1 is a block diagram that conceptually illustrates components of an example optical communication system 100.

As shown, communication system 100 may include a first rack, cabinet, chassis, blade, or housing 110, which may include an optical transmitter 115. Although a single optical transmitter 115 is illustrated as being included in housing 110, in alternative implementations, multiple optical transmitters may be included in a single housing 110. Optical transmitter 115 may include a number of transmitter blocks (TX) 120-1 to 120-N (referred to collectively as "transmitter blocks 120" or individually as "transmitter block 120"), each of which may receive a corresponding one of information streams DATA-1 to DATA-N, modulate the information streams with an optical signal, and output one or more optical signals or channels to a combiner or multiplexer 125. Each transmitter block 120 may include, for example, one or more optical sources (e.g., lasers), optical couplers, modulators, and/or other components, to modulate the respective input information stream DATA-1 to DATA-N with one or more optical carrier signals. In one implementation, each of transmitter blocks 120 may have the same or similar structure.

Multiplexer 125 may include, for example, an AWG to optically multiplex its input signals. Multiplexer 115 may receive a number of modulated optical signals and combine the optical signals for transmission onto an output optical communication path 130, such as an optical fiber, as a wavelength division multiplexed (WDM) optical signal. As used herein, an optical signal may refer to the WDM optical signal, as well as each optical signal included in the WDM optical signal. The optical signals may also be polarization multiplexed to include optical signals having both transverse electric (TE) and transverse magnetic (TM) polarizations.

Optical communication path 130 may include one or more segments of optical fiber and optical amplifiers 135, for example, to optically amplify or boost the power of the transmitted optical signals. In one example, optical signals output to optical communication path 130 may be polarization multiplexed optical signals that are modulated in accordance with a known modulation format, such as quadrature phase shift keying (QPSK), binary phase shift keying (BPSK) or other higher order QAM formats, as well as combinations of such modulation formats, e.g., certain optical signals may have a first modulation format, while others may have a second, different modulation format.

As further shown in FIG. 1, a receive node is provided that may include a second rack, cabinet, chassis, or housing 140, which may include one or more optical receivers 145. An optical splitter or demultiplexer 150, provided in optical receiver 145, may supply multiple output optical signals to a corresponding one of receiver blocks (RX) 155-1 to 155-N (referred to collectively as "receiver blocks 155" or individually as "receiver block 155"). In one implementation, demultiplexer 150 may include an AWG. Each of receiver blocks 155-1 to 155-N, in turn, may supply a corresponding copy of data or information streams DATA-1 to DATA-N in response to the optical signals. It is understood that each of transmitter blocks 120 may have the same or similar structure and each of receiver blocks 155 may have the same or similar structure.

Although FIG. 1 shows example components of optical communication system 100, in other implementations, optical communication system 100 may contain fewer components, different components, differently arranged components, and/or additional components than those depicted in FIG. 1. Alternatively, or additionally, one or more components of optical communication system 100 may perform one or more other tasks described as being performed by one or more other components of optical communication system 100.

FIG. 2 is a diagram illustrating an example of components of optical transmitter 115. Transmission blocks 120 are particularly shown in more detail in FIG. 2. Transmission blocks 120 of optical transmitter 115 may include a number of components, such as optical sources 210-1 through 210-N (referred to collectively as "optical sources 210" or individually as "optical source 210"). Multiplexer 125 may be a spectral multiplexer, such as AWG 225 shown in FIG. 2. Optical sources 210 and AWG 225 may be provided on a substrate 205. Substrate 205 may include indium phosphide (InP) or another semiconductor material. Substrate 205 may be used to implement a photonic integrated circuit (PIC).

Each optical source 210 may connect to an input waveguide of AWG 225. In one implementation, each optical source 210 may be a distributed feedback laser (DFB) or a distributed bragg reflector laser (DBR). Optical sources 210 may each be tunable to change the output wavelength of the optical signal output by each optical source. For example, each optical source 210 may be a tunable multi-section or segmented DBR laser and/or a laser, such as a DFB, that is tuned by heating/cooling. In one implementation, optical sources 210 may produce light that is tuned to designated wavelengths, which are offset from one another by a channel spacing equal or substantially equal to the FSR of AWG 225 divided by the number, N, of optical sources 210. Thus, the FSR of AWG 225 may be equal to N*ChSpacing (where ChSpacing represents the channel spacing). Preferably, AWG 225 has a relatively high mode order that is at least equal to 100.

As one example of the spectral spacing of optical sources 210, the FSR of the AWG may be equal to 250 GHz and N=10. In this case, each optical source 210 may be spectrally spaced by 25 GHz (250/10). Thus, for example, the frequency of optical source 210-2 may be 25 Ghz more than the frequency of optical source 210-1, the frequency of optical source 210-3 may be 25 Ghz more than the frequency of optical source 210-2, etc.

AWG 225 may include a group III-V material that is compatible with substrate 205. In one embodiment, AWG 225 includes InP based ternary compounds. AWG 225 may include a number of input and output couplers, dielectric slabs, and intermediate waveguides. AWG 225 may be "cyclic", in that optical signals having wavelengths that are spectrally spaced from one another by the FSR of the AWG may be output from the AWG. An example implementation of AWG 225 is discussed in more detail below with reference to FIG. 4. In one implementation, optical sources 210 may each be fully tunable over the entire C-band or over substantially the entire C-band.

As is further shown in FIG. 2, a control circuit 230 may be additionally included. Control circuit 230 may include logic to control the tuning of optical sources 210. For example, control circuit 230 may include a processor, a microprocessor, an application specific integrated circuit (ASIC), or another type of logic, to selectively tune optical sources 210. In one implementation, in which optical sources 210 include multi-section DBRs, control circuit 230 may output one or more input signals, such as electrical currents, to each optical source 210 to control the tuning of the optical source. Alternatively, or additionally, control circuit 230 may control a heater associated with each optical source 210 or a single heater associated with optical sources 210, to control the tuning of optical sources 210. As previously mentioned, control circuit 230 may control optical sources 210 as a group, so that the wavelength/frequency produced by each optical source 210 may be tuned by shifting all of optical sources 210 in multiples of the FSR of AWG 225.

In one implementation, control circuit 230 may be programmed during manufacture or during provisioning of optical communication system 100 to control optical sources 210 to provide optical signals at designated wavelengths that are separated from one another by the AWG FSR. For example, for an optical communication system that is designed to transmit optical signals having wavelengths in a first band, control circuit 230 may be provisioned to tune optical sources 210 to that first band. In contrast, for an optical communication system that is designed to transmit optical signals having wavelengths in a second band, control circuit 230 may be provisioned to tune optical sources 210 to the second band. In either instance, AWG 225 need not be tuned. In this manner, a single substrate and/or PIC may be manufactured with a large potential range of operating frequencies or wavelengths, such as those throughout the C-band.

Figure 3A:
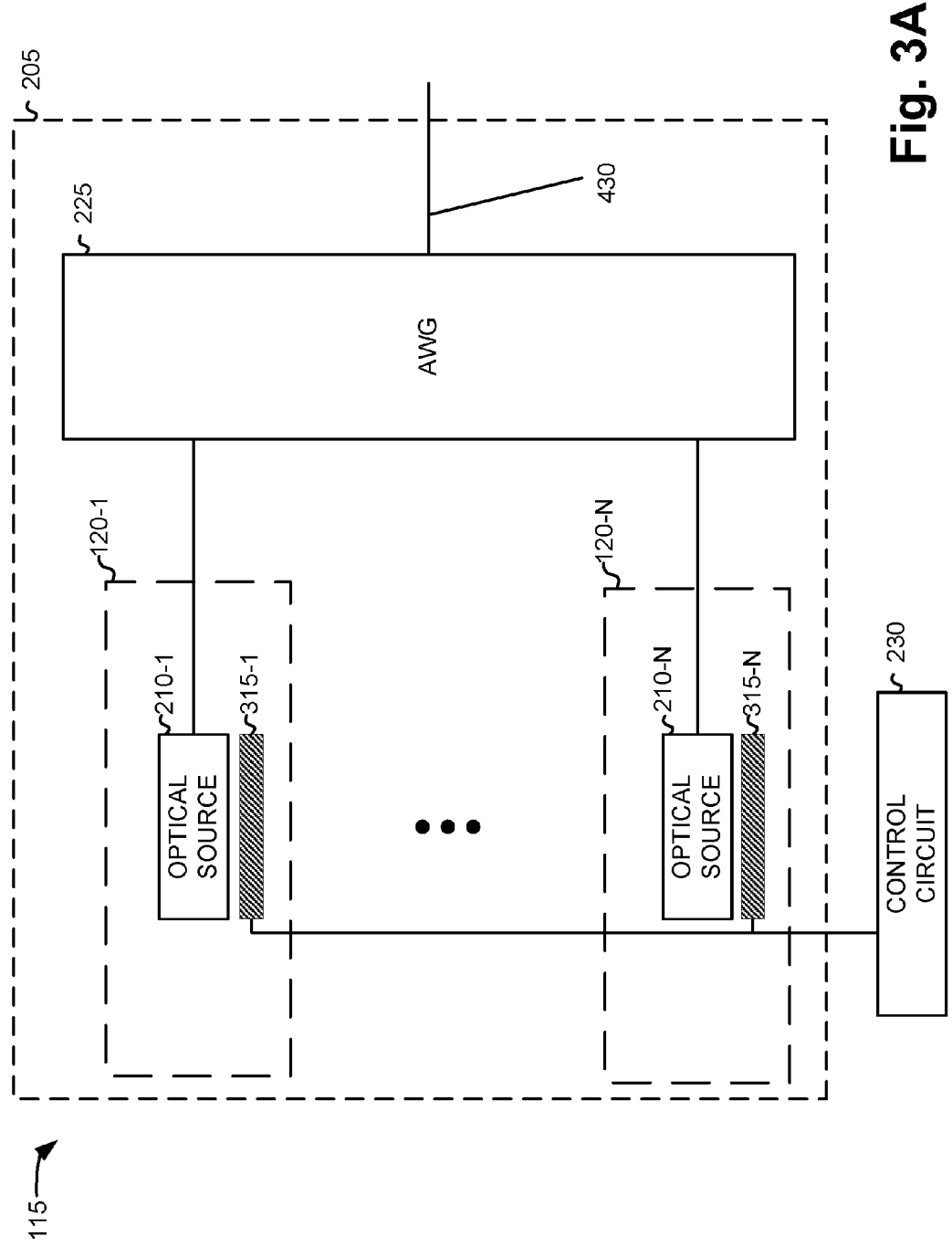
FIGS. 3A-3C are diagrams illustrating other examples of components of an optical transmitter.
Figure 3B:
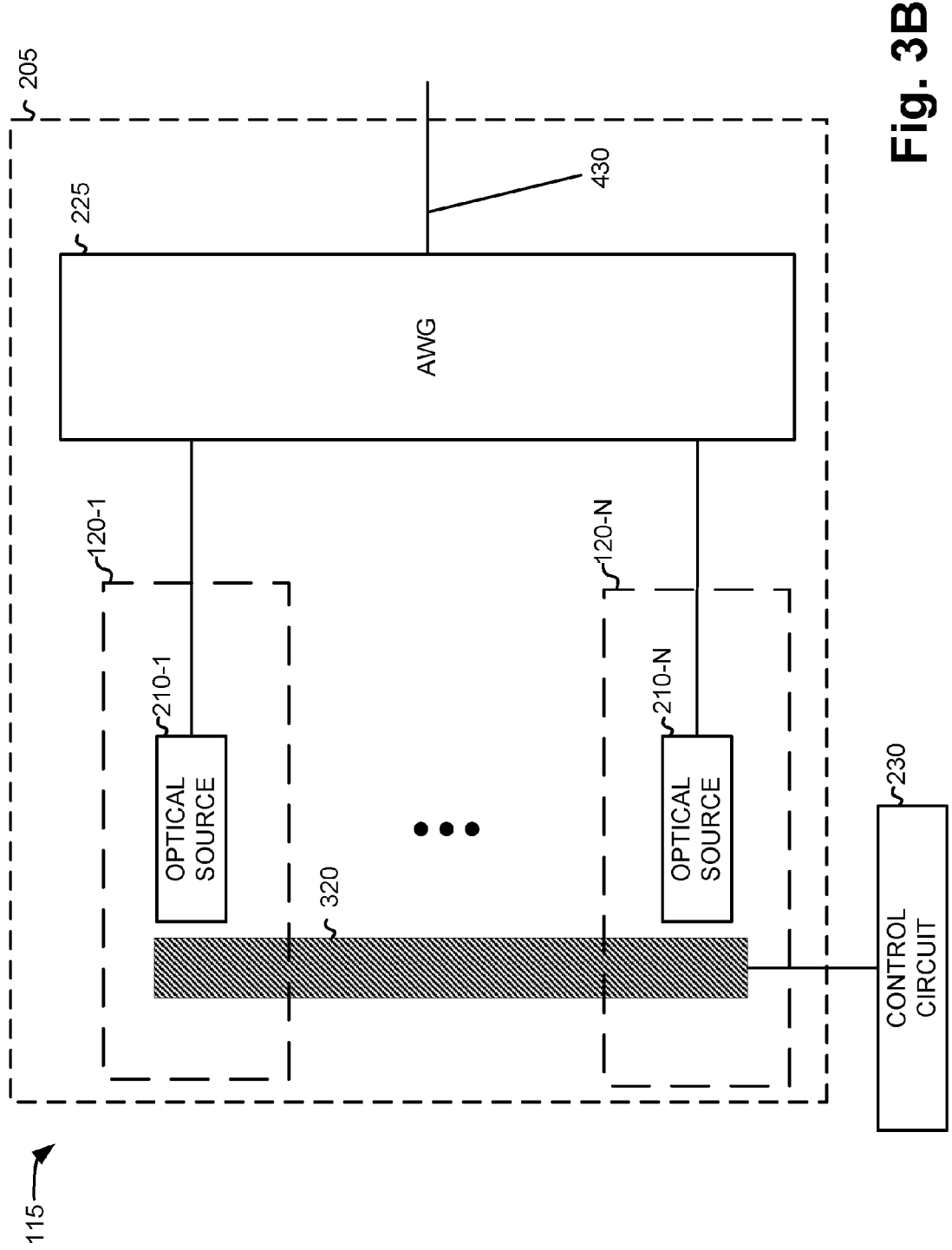
Figure 3C:
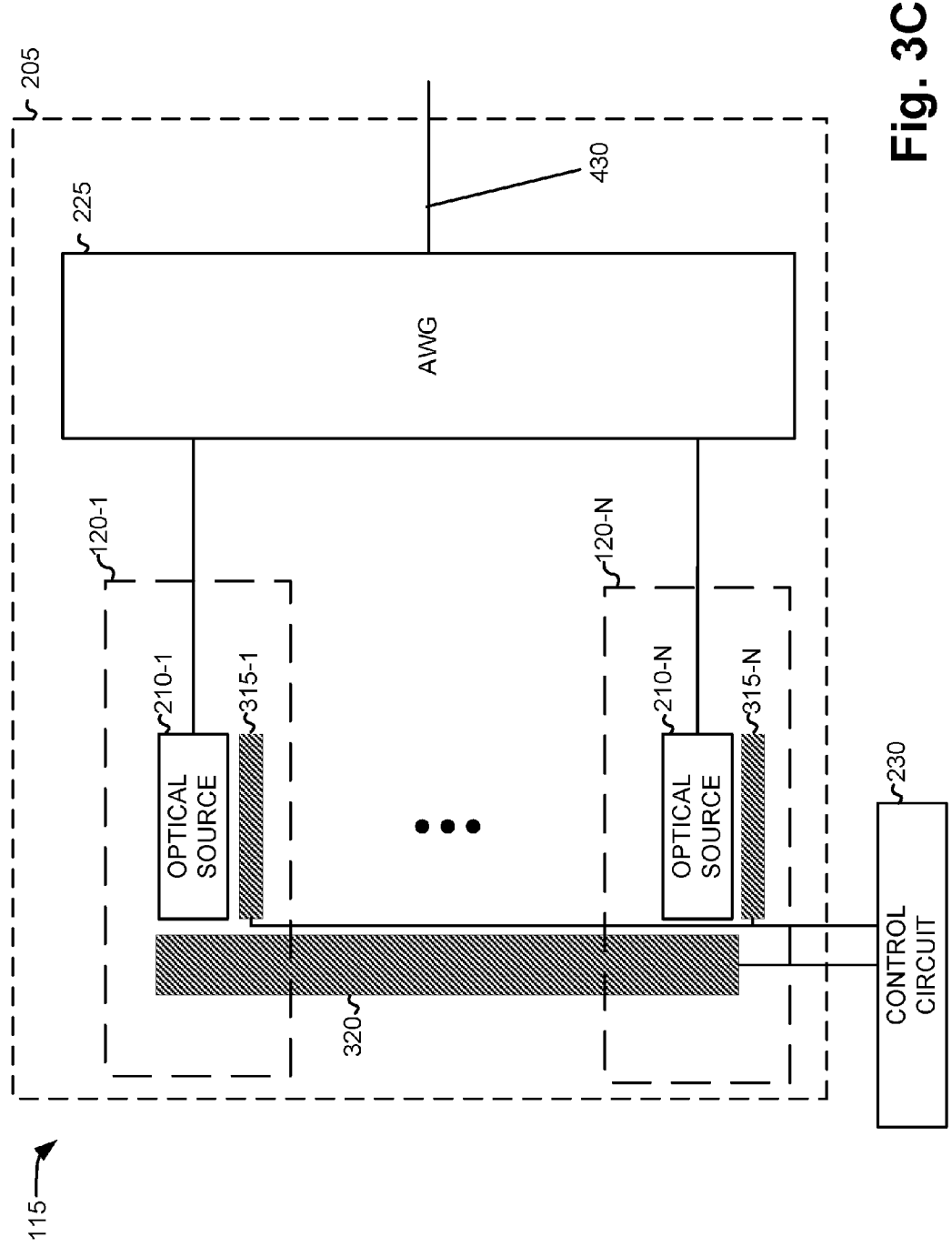

FIGS. 3A-3C are diagrams illustrating another example of components of an optical transmitter 115. Some components of FIGS. 3A-3C are similar to those of FIG. 2. Additionally, however, in FIGS. 3A-3C, tuning elements, which may be used to tune the frequency of optical sources 210, are illustrated.

In FIG. 3A, tuning elements 315-1 through 315-N (referred to collectively as "tuning elements 315" or individually as "tuning element 315"), associated with each of optical sources 210 and disposed on substrate 205, are illustrated. Each of tuning elements 315 may be, for example, a thin film heater (e.g., including a thin film of platinum, for example) or a thermoelectric cooler (TEC). Tuning elements 315 may be controlled by, for example, control circuit 230, to supply a current or voltage thereto in order to heat (or cool) optical sources 210. Changing the temperature of optical sources 210 may cause the light frequencies or wavelengths of optical signals generated by optical sources 210 to shift. Thus, with tuning elements 315, control circuit 230 can individually tune each of optical sources 210 to the desired operating frequency.

In FIG. 3B, a tuning element 320 is illustrated as a single tuning element to adjust the temperature of substrate 205. Tuning element 320 may include, for example, a TEC, or a carrier on a chip (COC) heater. Tuning element 320 may be controlled by, for example, control circuit 230 to heat (or cool) optical sources 210. In contrast to tuning elements 315 (FIG. 3A), optical sources 210 may be tuned by tuning elements 320 as a group to shift the wavelengths of the optical signals supplied by all of optical sources 210. Thus, with tuning element 320, control circuit 230 can tune, as a group, optical sources 210 to the desired operating wavelengths.

FIG. 3C is a diagram illustrating an examplary implementation of tuning elements that include the features of FIGS. 3A and 3B. As shown in FIG. 3C, both tuning elements 315 and 320 may be implemented. Tuning element 320 may provide "coarse-grain" tuning and may be used to shift, as a group, the operating frequencies of optical sources 210. Tuning elements 315-1 through 315-N may then be used to fine-tune the operating frequencies of optical sources 210. For instance, in operation, control circuit 230 may initially control tuning element 320 to tune the operating frequency of each of optical sources 210 to the desired FSR band. Control circuit 230 may then control tuning elements 315 to individually fine-tune each of optical sources 210 to match the passbands of AWG 225. Although temperature tuning of optical sources 210 is described above, each source may be electronically tune instead of or in addition to such temperature tuning. For example, as noted above, if the optical sources include a DBR laser, the wavelength of the light output from each optical source may be adjusted by varying the current supplied to the optical source.

Although FIGS. 2 and 3A-3C show example components of optical transmitter 115, in other implementations, optical transmitter 115 may contain fewer components, different components, differently arranged components, or additional components than those depicted in FIGS. 2 and 3A-3C. Alternatively, or additionally, one or more components of optical transmitter 115 may perform one or more other tasks described as being performed by one or more other components of optical transmitter 115.

As noted above, the outputs of optical sources 210 may be fed to a spectral multiplexer, such as AWG 225. Other spectral multiplexers may be employed, however, such as a series of cascaded asymmetric Mach-Zehnder interferometers, one of example of which is described in U.S. Pat. No. 7,995,923, the entire contents of which are incorporated herein by reference. In another example, the outputs of optical sources 210 may be supplied to a power combiner, and the wavelengths of such outputs may be tuned as desired. Such a power combiner, however, may have a higher insertion loss than the spectral multiplexers discussed above.

Figure 4:
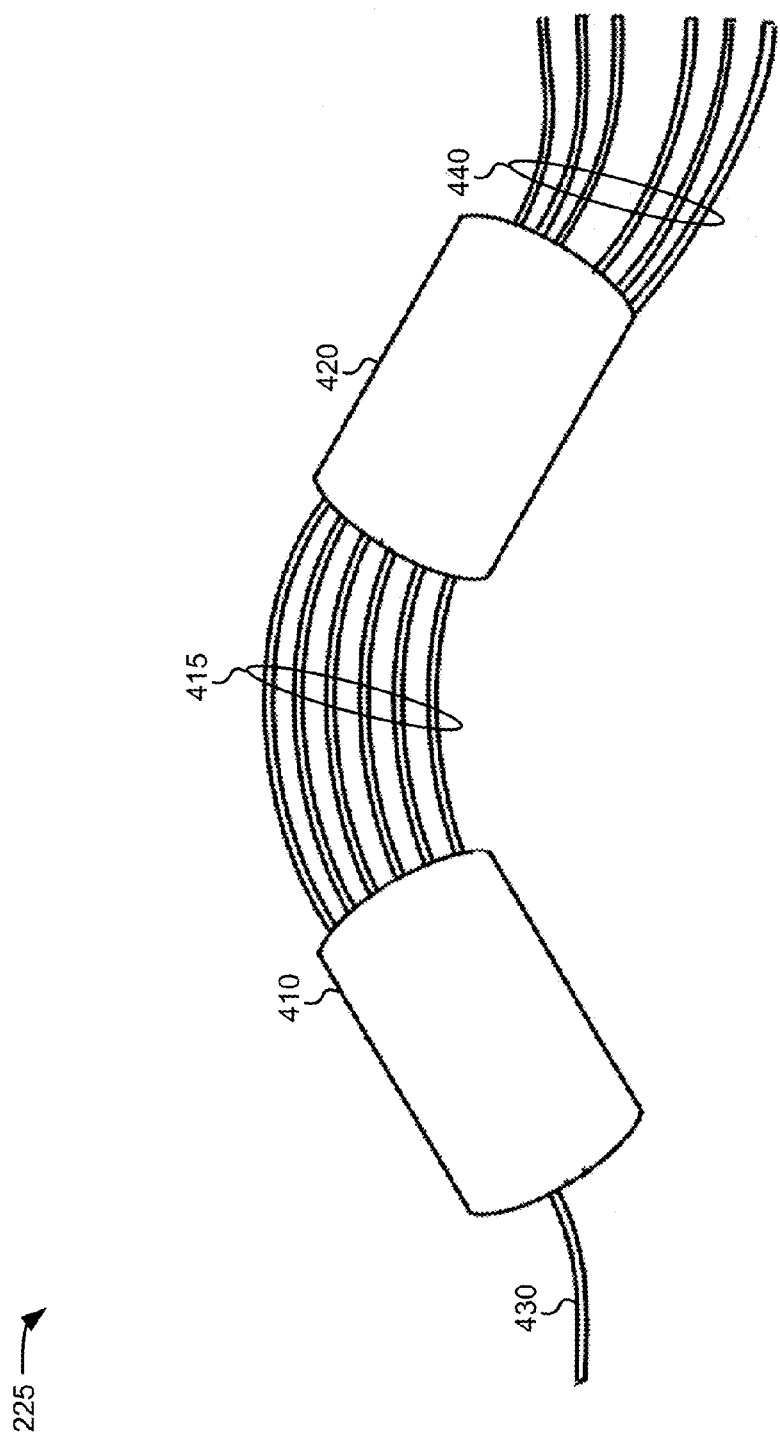
FIG. 4 is a diagram illustrating an example of an implementation of an arrayed waveguide grating.

FIG. 4 is a diagram illustrating an example of an implementation of AWG 225. AWG 225 may include a pair of free space propagation regions, which may be implemented as dielectric slab waveguides 410 and 420. Slab waveguides 410 and 420 may be coupled to one another by a plurality of grating waveguides 415. Typically, each grating waveguide 415 may have a different length, and the lengths may be spaced from one another by predetermined amounts. A first set of input/output waveguides 430 (one waveguide 430 is illustrated) may be coupled to slab waveguide 410. A second set of input/output waveguides 440 (six waveguides 440 are illustrated) may be coupled to slab waveguide 420. Light may generally propagate in either direction through AWG 225. Thus, AWG 225 may act as an optical multiplexer, in which light is received at waveguides 440 and output through waveguide 430, or as an optical de-multiplexer, in which light is received at waveguide 430 and output through waveguides 440.

When operating as a multiplexer, each input waveguide 440 may be designed to accept light or an optical signal having a particular frequency or wavelength over a relatively narrow range of frequencies or wavelengths (called the passband for the waveguide 440), where the various optical signals on each of input waveguides 440 may be offset from one another and where the total spectral range of all of input waveguides 440 represents the FSR of AWG 225. Additionally, and as previously mentioned, AWG 225 may be configured as a cyclic AWG.

Figure 5:
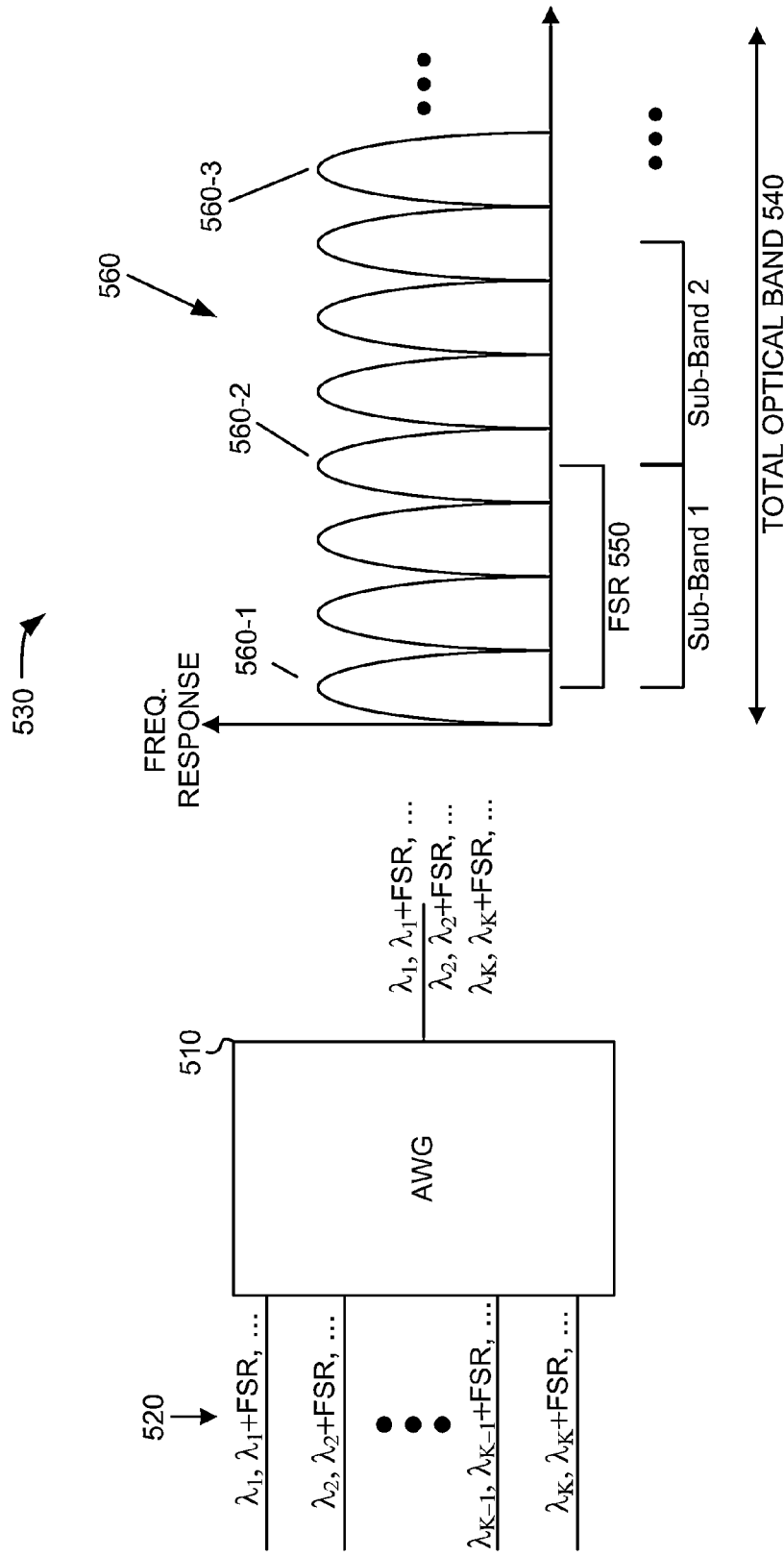
FIGS. 5A and 5B conceptually illustrate a cyclic arrayed waveguide grating.

FIGS. 5A and 5B conceptually illustrate a cyclic AWG. In FIG. 5A, an AWG 510 is illustrated as a multiplexer in which input waveguides 520 are each associated with a number of passbands that are offset from one another by the FSR of AWG 510. For instance, the first waveguide of waveguides 520 may be designed to pass light having wavelengths substantially equal $\lambda_1$, $\lambda_1$+FSR, $\lambda_1$+2FSR, $\lambda_1$+3FSR, etc. Similarly, the second waveguide of waveguides 520 may be designed to pass light having wavelengths substantially equal to $\lambda_2$, $\lambda_2$+FSR, $\lambda_2$+2FSR, $\lambda_2$+3FSR, etc. Here, $\lambda_1$ and $\lambda_2$ may be offset by less than the full FSR. As noted above, it is assumed that AWG 510 has a relatively high order, such as an order that is greater than 100.

FIG. 5B is a diagram conceptually illustrating the frequency response or transmission characteristic of AWG 510 over all of input waveguides 520 (e.g., frequency response curves corresponding to four waveguides are illustrated in FIG. 5B). Frequency response 530 is illustrated as covering a band, labeled as total optical band 540. Total optical band 540 may represent the entire frequency or wavelength range over which AWG 225 (and hence optical communication system 100) may operate. Total optical band 540 may correspond to, for example, the optical C-band. Within total optical band 540, selected transmission peaks 560 are spaced apart from each other by FSR 550 are illustrated, e.g., 560-1, 560-2, and 560-3. In addition, peaks 560 may be grouped into bands (Band 1, Band 2, etc.) and each band may have a width that is equal to FSR 550 Each peak 560 may correspond to the frequency of minimum attenuation of the input optical signal.

In one implementation, FSR 550 may be 500 GHz, and in another example it is 250 GHz. Total optical band 540 may cover, for example, approximately 1 THz, such that at least four bands (two of which are shown as Band 1 and Band 2) are included in total optical band 540. In one implementation, control circuit 230 may select various optical sources 210 in each pairing to provide optical signals having wavelengths that are in different bands, such that some optical signals have wavelengths in Band 1 and others have wavelengths in band 2.

Figure 6:
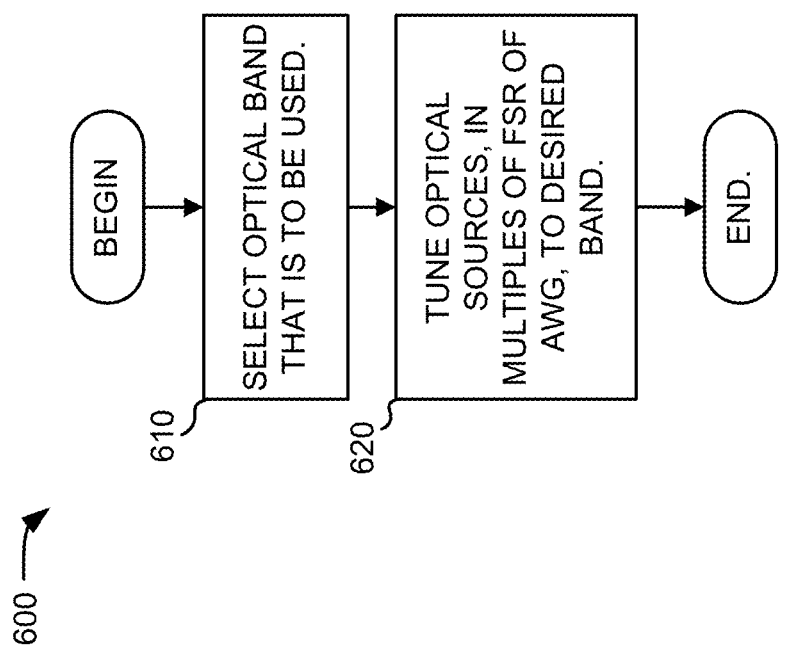
FIG. 6 is a flow chart illustrating an example of operations for tuning an optical transmitter.

FIG. 6 is a flow chart illustrating an example of operations 600 for tuning optical transmitter 115. Similar operations may apply to the tuning of an optical receiver 145. In general, optical transmitters 115 and optical receivers 145 may be tuned to match one another.

Process 600 may include selecting the optical band that is to be implemented by optical transmitter 115 (block 610). For example, the optical band may be a range of wavelengths band, in the C-band. The optical band to be used may be determined, for example, by the particular design requirements of the optical communication system. The optical band to use may be chosen by a designer during the initial provisioning or manufacture of optical transmitter 115.

Process 600 may further include tuning optical sources 210, in multiples of the FSR of AWG 225, to the desired band (block 620). For example, control circuit 230 may control tuning elements 315 and/or tuning element 320 to tune the group of optical sources 210 to the optical band that is to be used. In an alternative implementation, optical sources 210 may include optical sources that are tuned using techniques other than thermal tuning, such as through the control or selection of tuning parameters relating to optical sources 210. In this situation, control circuit 230 may control the tuning parameters to set optical sources 210 to the desired FSR band. As noted above, when the optical source includes a DBR laser, the optical signal wavelength may be adjusted by controlling the current supplied to the DBR laser.

An example of wavelength tuning in accordance with process 600 will next be discussed with reference to FIGS. 7 and 8.

Figure 7:
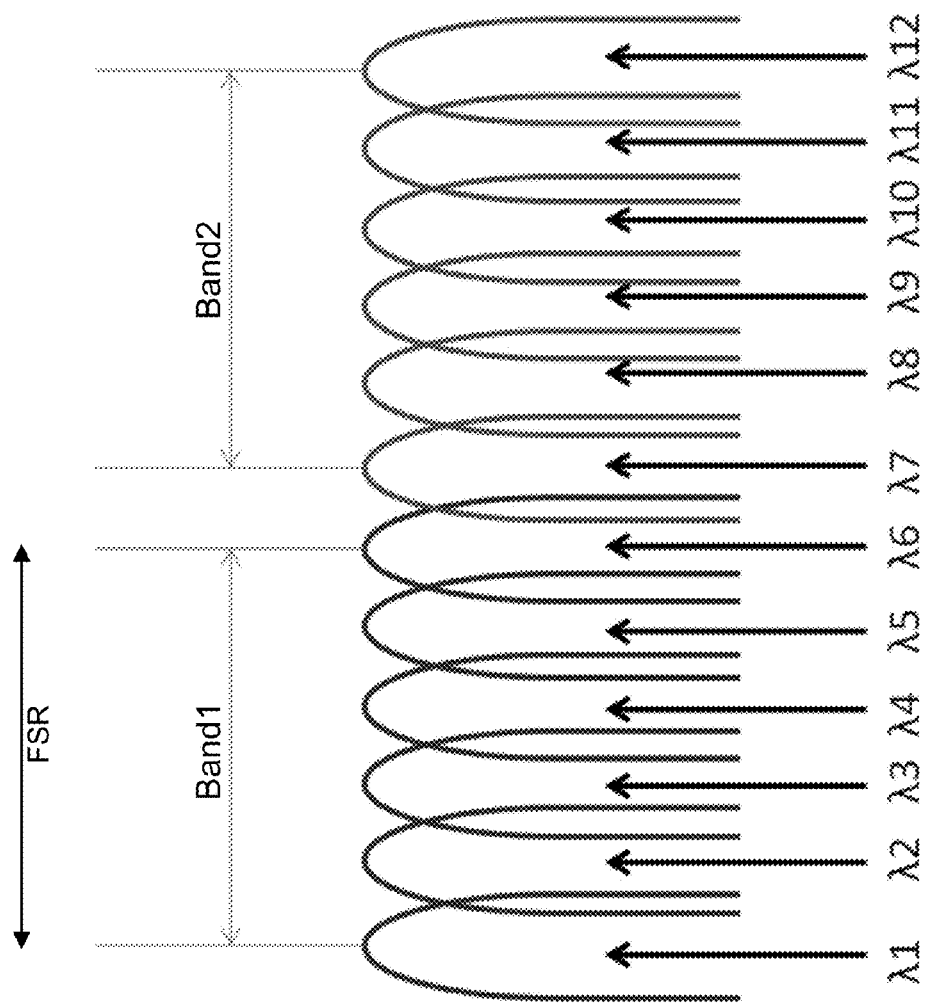
FIGS. 7 and 8 are diagrams illustrating potential arrayed waveguide grating passbands and optical signal wavelengths corresponding to an optical transmitter.

FIG. 7 is a diagram illustrating potential AWG passbands and optical signal wavelengths corresponding to optical transmitter 115. For this example, assume that six optical sources 210-1 through 210-6, such as using six DFB lasers, are implemented (i.e., N=6). The wavelengths of the optical signals output from the six optical sources may be controlled to cover a number of possible bands, shown as Band1 and Band2 in FIG. 7. In Band1, the six optical sources may generate light having wavelengths $\lambda_1$ to $\lambda_6$, respectively. The six wavelengths $\lambda_1$ through $\lambda_6$ may be equally spaced from one another by the channel spacing FSR/N. Similarly, in Band2, the six optical sources may generate light having wavelengths $\lambda_7$ to $\lambda_{12}$, respectively, and the six wavelengths $\lambda_7$ through $\lambda_{12}$ may also be equally spaced from one another by the channel spacing FSR/N. Control circuit 230 may tune the six optical sources to provide optical signals in either Band1 or Band2. Alternatively, selected optical sources may be controlled to provide optical signals having wavelengths in Band1 while others supply optical signals having wavelengths in Band2.

Figure 8:
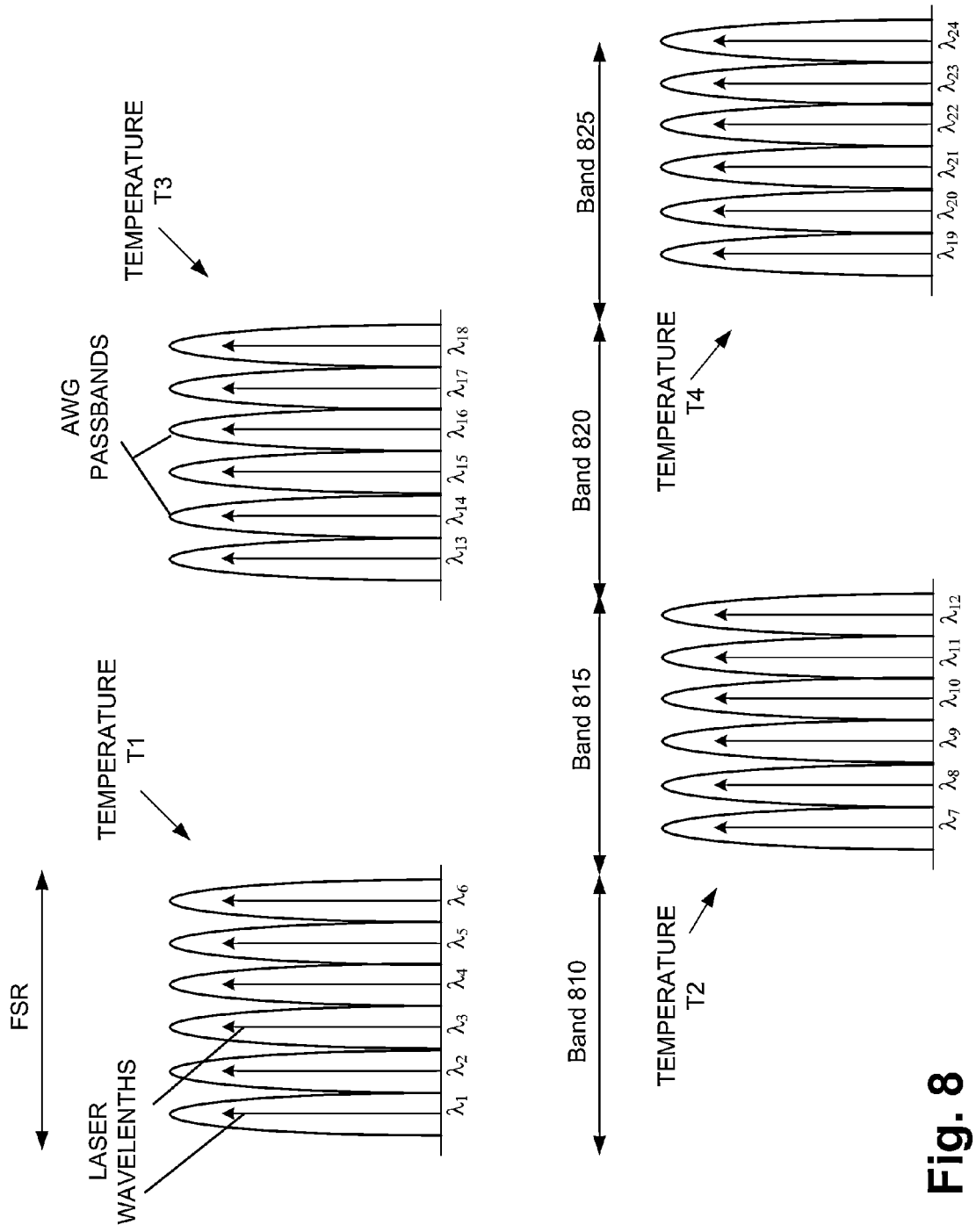

FIG. 8 is a diagram illustrating another example of potential AWG passbands and optical signal wavelengths corresponding to optical transmitter 115. In this example, optical sources 210 may potentially transmit optical signals having wavelengths in any of four bands 810, 815, 820, and 825. Bands 810-825 may correspond to, for example, 250 GHz bands that together cover the 1 THz optical C-band. In this example, assume that six optical sources, optical sources 210-1 through 210-6, are tuned using thermal tuning Band 810 may be covered when optical sources 210-1 through 210-6 are tuned to wavelengths $\lambda_1$ through $\lambda_6$, respectively, such as by controlling tuning element 320 to be at a first temperature (T1). Similarly, Band 820 may be covered when optical sources 210-1 through 210-6 are tuned to wavelengths $\lambda_7$ through $\lambda_{12}$, respectively, such as by controlling tuning element 320 to be at a second temperature (T2); Band 830 may be covered when optical sources 210-1 through 210-6 are tuned to wavelengths $\lambda_{13}$ through $\lambda_{18}$, respectively, such as by controlling tuning element 320 to be at a third temperature (T3); and Band 840 may be covered when optical sources 210-1 through 210-6 are tuned to wavelengths $\lambda_{19}$ through $\lambda_{24}$, respectively, such as by controlling tuning element 320 to be at a fourth temperature (T4). As noted above, AWG 225 need not be tuned separately during the tuning of optical sources 210-1 through 210-6. In one example, temperatures T1 and T3 may be substantially the same.

In the example discussed above with respect to FIG. 8, as well as other examples disclosed herein, the optical sources may alternatively be electronically tuned, such as by varying or controlling the electrical current supplied to each optical source.

The optical transmitter 115, as discussed with respect to FIGS. 2-7, may be implemented in accordance with various possible configurations of optical and/or electrical components. An example implementation will next be discussed with respect to FIG. 9.

Figure 9:
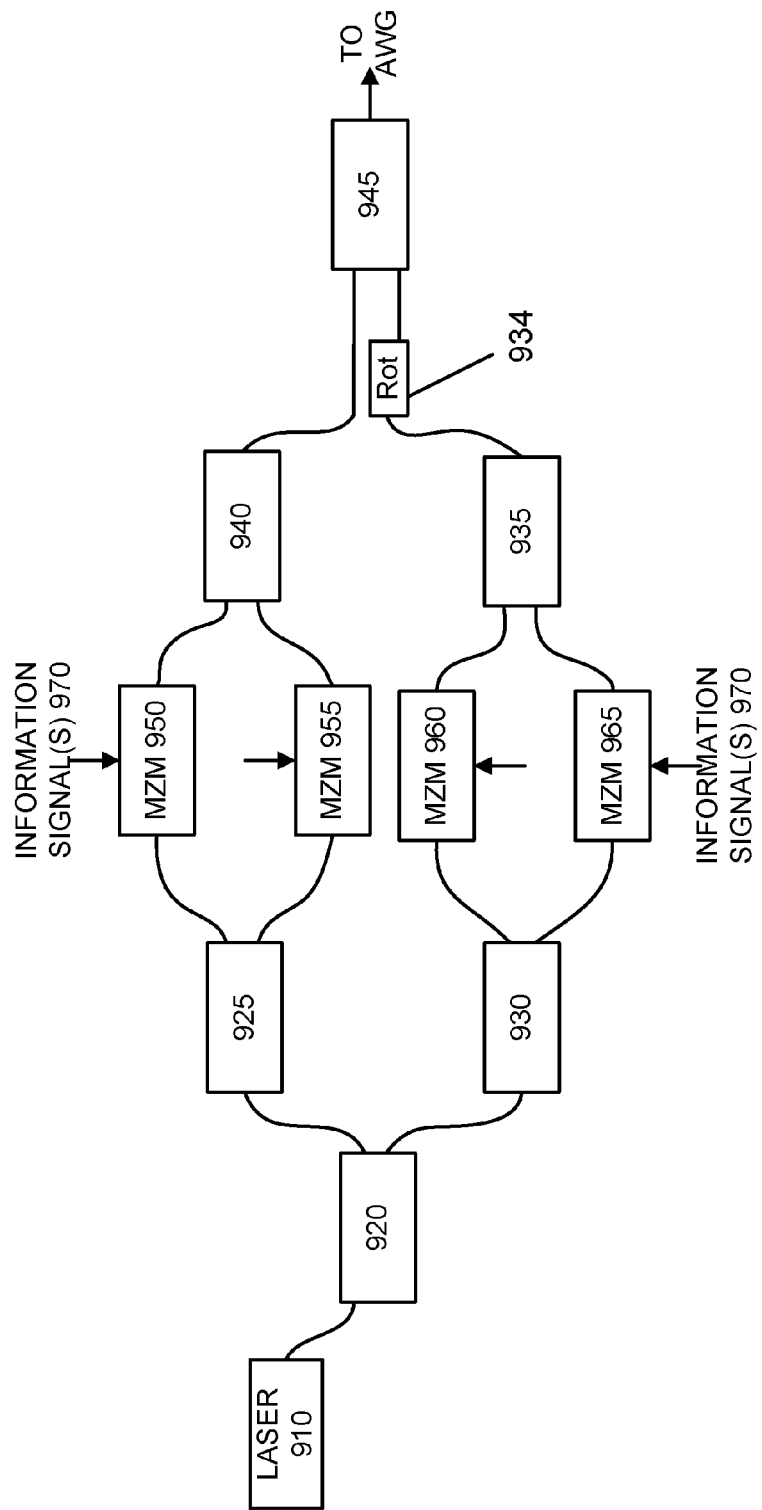
FIGS. 9 and 10 are diagrams illustrating first and second examples, respectively, of a transmitter block consistent with further aspects of the present disclosure.

FIG. 9 is a diagram illustrating one example implementation of a transmitter block 120. For clarity, tuning elements 315 and 320 are not illustrated in FIG. 9, but may, in certain implementations, be included.

As shown in FIG. 9, a laser 910 may generate light that is transmitted through a number of optical splitters or couplers 920, 925, 930, 935, and 940, and a number of Mach-Zehnder interferometers or modulators (MZMs) 950, 955, 960, and 965. The input information signal(s) that are to be modulated with the carrier wave optical signals from lasers 910/915 are shown as information signal(s) 970.

Tunable laser 910 may correspond to an optical source 210 and connected to one input of a coupler 920. As illustrated, coupler 920 may receive the output of laser 910, and may provide a split optical signal to couplers 925 and 930, which may further split the optical signal into four signals, which may be provided to Mach Zehnder modulators ("MZMs") 950, 955, 960, and 965. The output of MZMs 950, 955, 960, and 965 may be combined by couplers 935 and 940, and then by coupler 945, for output to AWG 225, for wave division multiplexing.

Optical couplers 920, 925, 930, 935, 940, and 945 may each include 2×2 or 2×1 multi-mode interference optical couplers that act to receive light at input waveguides, mix or split the light, and output the light at output waveguides. In one implementation, each of couplers 920, 925, 930, 935, and 940 may be a 2×2 coupler, in which those of the couplers that are shown with a single input port or output port may be 2×2 couplers in which one input/output port is not connected. Alternatively, directional couplers may be employed.

MZMs 950, 955, 960, and 965 may include, for example, InP based or other group III-V based materials noted above. In general, an MZM may operate by splitting an incoming optical signal and transmitting the split optical signal down two different paths. Delay, and hence a phase shift, in the optical paths, may be controlled by input information or drive signal(s) 970 in a known manner.

As further shown in FIG. 9, the polarization of light or optical signals output from coupler 935 may be rotated by a polarization rotator 934. In one example, the polarization of such light may be rotated to have a TM polarization. The outputs of rotator 934 and coupler 940 may next be supplied to a polarization beam combiner 945, which polarization multiplexes such outputs. The output of polarization beam combiner 945 may next be supplied to an AWG. Alternatively, the output of coupler 940, along with optical signals having other wavelengths, may be supplied to a first AWG and the output of coupler 935 may be supplied, along with other optical signals having other wavelengths, to a second AWG. The output of the second AWG may then be polarization rotated and combined with the output of the first AWG by a known power combiner or a known filter. Exemplary multiplexing arrangements are discussed in U.S. Patent Application Publication No. 2010/0322628, filed Oct. 1, 2009, the entire contents of which are incorporated herein by reference.

Figure 10:
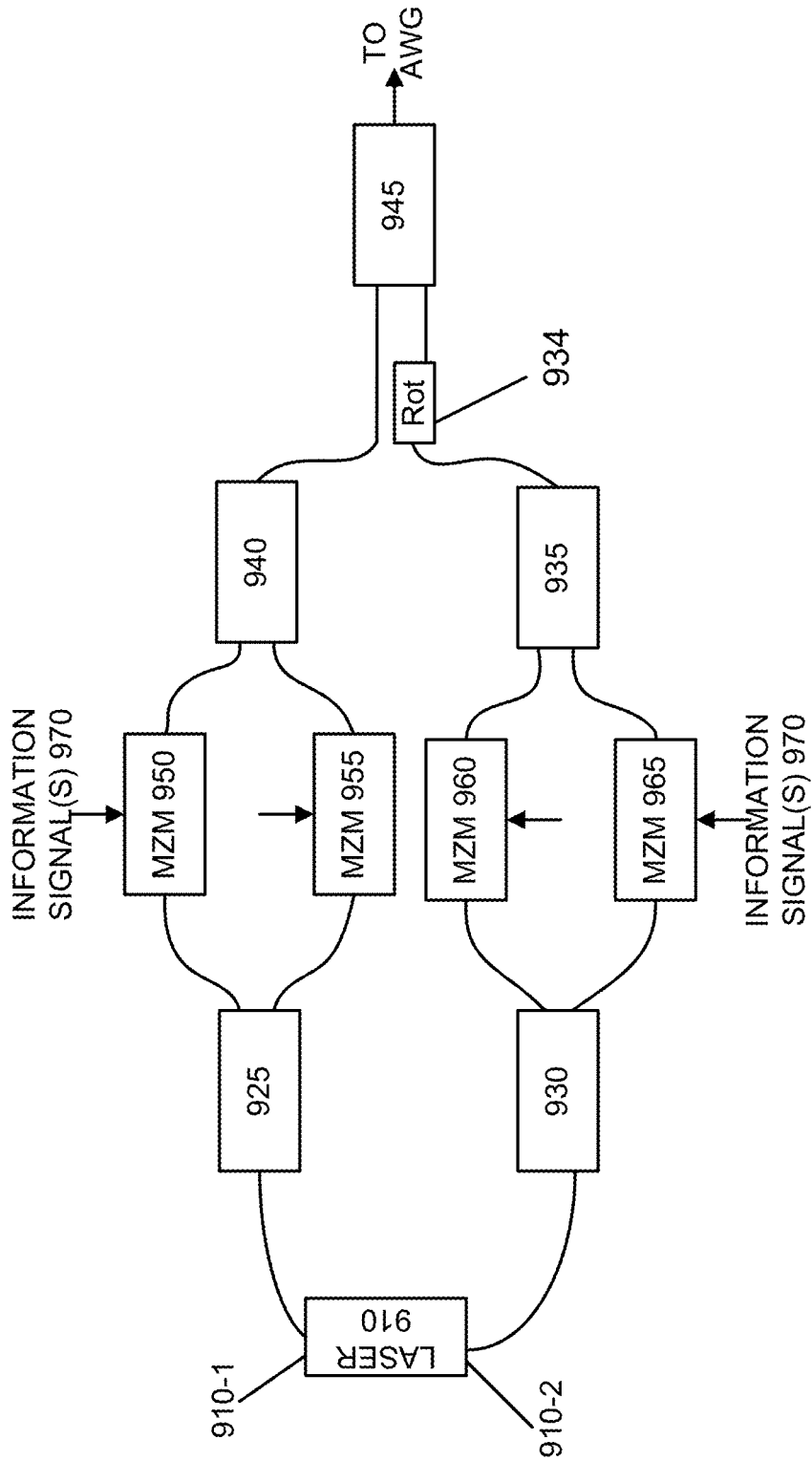

FIG. 10 is a diagram illustrating a second example implementation of a transmitter block 120. The optical source group of FIG. 10 is similar to that of FIG. 9, except that, instead of power splitting the output of laser 910 with coupler 920, light output from facet or side 910-1 is supplied to coupler 925, and light output from facet or side 910-2 is provided to coupler 930. Otherwise the structure and operation of transmitter block 120 shown in FIG. 9 is similar to that of transmitter block 120 shown in FIG. 9.

Although FIGS. 9 and 10 show example components of a transmitter block 120, in other implementations, transmitter block 120 may contain fewer components, different components, differently arranged components, or additional components than those depicted in FIGS. 9 and 10. Alternatively, or additionally, one or more components of transmitter block 120 may perform one or more other tasks described as being performed by one or more other components of transmitter block 120.

The foregoing description provides illustration and description, but is not intended to be exhaustive or to limit the embodiments to the precise form disclosed. Modifications and variations are possible in light of the above teachings or may be acquired from practice of the embodiments.

Even though particular combinations of features are recited in the claims and/or disclosed in the specification, these combinations are not intended to limit the disclosure of the possible embodiments. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An apparatus, comprising:
    a first optical source configured to selectively supply first and second optical signals having a first wavelength or third and fourth optical signals having a second wavelength, the first optical source including a first laser including first and second sides, the first and second optical signals being output from the first and second sides, respectively, of the first laser, and the third and fourth optical signals being output from the first and second sides, respectively, of the first laser;
    a second optical source configured to selectively supply fifth and sixth optical signals having a third wavelength or seventh and eighth optical signals having a fourth wavelength, the second optical source including a second laser including first and second sides, the fourth and fifth optical signals being output from the first and second sides, respectively, of the second laser, and the seventh and eighth optical signals being output from the first and second sides, respectively, of the second laser;
    a spectral multiplexer grating having a plurality of input waveguides, and an output waveguide, one of the plurality of input waveguides having associated first and second passbands, the first passband being spectrally spaced from the second passband, the first passband including the first wavelength and the second passband including the second wavelength, and a second one of the plurality of input waveguides having associated third and fourth passbands, the third passband being spectrally spaced from the fourth passband, the third passband including the third wavelength and the fourth passband including the fourth wavelength; and
    a control circuit to:
        tune the first optical source to supply the first and second optical signals and tune the second optical source to supply the fifth and sixth optical signals, such that the spectral multiplexer receives the first and second optical signals and the fifth and sixth optical signals; or
        tune the first optical source to supply the third and fourth optical signals and the second optical source to supply the seven and eighth and optical signals, such the spectral multiplexer receives the third and fourth optical signals and the seven and eighth optical signals,
        where the spectral multiplexer includes an arrayed waveguide grating (AWG), the first and second passbands are spaced from each other by a free spectral range (FSR) associated with the arrayed waveguide grating, and the third and fourth passbands are spaced from each other by the FSR associated with the arrayed waveguide grating, the AWG having an order that is at least equal to 100.

2. The apparatus of claim 1, where the first and third optical signals are spaced from one another by a particular channel width and the second and fourth optical signals are spaced from one another by the particular channel width.

3. The apparatus of claim 1, wherein the FSR is substantially equal to 500 GHz or 250 GHz.

4. The apparatus of claim 1, further including a tuning element, the tuning element being configured to:
    control the first optical source to selectively supply the first and second optical signals or the third and fourth optical signals; and control the second optical source to selectively supply the fifth and sixth optical signals or the seven and eighth optical signals.

5. The apparatus of claim 4, where the tuning element includes a single thin film heater disposed to heat the first optical source and the second optical source.

6. The apparatus of claim 4, where the tuning element includes a first thin film heater disposed to heat the first optical source and a second thin film heater disposed to heat the second optical source.

7. The apparatus of claim 1, where the first and second optical sources include distributed feedback lasers (DFBs) or distributed bragg reflector lasers (DBRs).

8. The apparatus of claim 1, where a total tunable range of the first and second optical sources substantially cover all of the optical C-band.

9. The apparatus of claim 1, where the first wavelength has an associated first frequency, the second wavelength has an associated second frequency, the third wavelength has an associated third frequency, and the fourth wavelength has an associated fourth frequency, the first and second frequencies being spectrally spaced from one another by 250 GHz, and the third and fourth frequencies being spectrally spaced from one another by 250 GHz.

10. The apparatus of claim 1, further including:
a substrate, the spectral multiplexer and the first and second optical sources being provided on the substrate, where the substrate includes indium phosphide (InP).

11. An apparatus, comprising:
a substrate;
an arrayed waveguide grating provided on the substrate, the arrayed waveguide grating having a plurality of input waveguides, a plurality of intermediate waveguides, and an output waveguide, the arrayed waveguide grating having an order that is at least equal to 100;
a plurality of optical sources, each of the plurality of optical sources being coupled to a corresponding one of the input waveguides of the arrayed waveguide grating, and one of the plurality of optical sources supplying one of a plurality of pairs of optical signals, for each of the plurality of pairs of optical signals, each said optical signal being output from a respective side of a laser included in each of the plurality of optical sources, each of the plurality of pairs of optical signals being supplied from a respective one of the plurality of optical sources to the arrayed waveguide grating, where each of the plurality pairs of optical signals has a corresponding one of a plurality of wavelengths, each of the plurality of wavelengths being spectrally spaced from one another by a frequency corresponding to an FSR associated with the arrayed waveguide grating; and
a control circuit to selectively control said one of the plurality of optical sources to supply said one of the plurality of optical signals.

12. The apparatus of claim 11, further comprising:
one or more heating elements associated with the plurality of optical sources, where the one or more heating elements are controlled by the control circuit to tune the plurality of optical sources.

13. The apparatus of claim 12, where the one or more heating elements include thin film heaters disposed on the substrate to heat the plurality of optical sources.

14. The apparatus of claim 11, where the FSRs are each substantially equal to 500 GHz or 250 GHz.

15. The apparatus of claim 11, where the plurality of optical sources include distributed feedback lasers (DFBs) or distributed bragg reflector lasers (DBRs).

16. The apparatus of claim 11, where a total tunable range of the plurality of optical sources substantially covers all of the optical C-band.

17. The apparatus of claim 11, where the substrate includes indium phosphide (InP).

18. An apparatus, comprising:
a first optical source including a first laser having first and second sides, the first optical source being configured to supply a first optical signal from the first side and a second optical signal from the second side, the first and second optical signals having a wavelength selected from a first set of wavelengths, where the first set of wavelengths includes one wavelength from each of a plurality of frequency bands;
a second optical source including a second laser having first and second sides, the second optical source being configured to supply a third optical signal from the first side of the second laser and a fourth optical signal from the second side of the second laser, the third and fourth optical signals having a wavelength selected from a second set of wavelengths, where the second set of wavelengths includes one wavelength from each of the plurality of frequency bands;
an arrayed waveguide grating having a plurality of input waveguides, a plurality of intermediate waveguides, and an output waveguide, one of the plurality of input waveguides having passbands associated with each of the first set of wavelengths and a second one of the plurality of input waveguides having passbands associated with each of the second set of wavelengths, the first and second optical signals and the third and fourth optical signals being supplied to the arrayed waveguide grating, the arrayed waveguide grating having an order that is at least equal to 100; and
a control circuit to:
selectively control the first optical source such that the first and second optical signals have a first wavelength selected from the first set of wavelengths, and
selectively control the second optical source such that the third and fourth optical signals have a second wavelength selected from the second set of wavelengths.

19. The apparatus of claim 18, where the first and second wavelengths are selected from a same one of the plurality of frequency bands.

20. The apparatus of claim 18, where the plurality of frequency bands include non-overlapping bands within an optical C-band.

21. The apparatus of claim 18, where the plurality of frequency bands cover substantially all of an optical C-band.

22. The apparatus of claim 18, further comprising:
one or more tuning elements, controlled by the control circuit, to selectively control the first and second optical sources.

23. The apparatus of claim 22, where the one or more tuning elements include a single thin film heater disposed to heat the first optical source and the second optical source.

24. The apparatus of claim 22, where the one or more tuning elements include a first thin film heater disposed to heat the first optical source and a second thin film heater disposed to heat the second optical source.

25. The apparatus of claim 18, further comprising:
a substrate on which at least the first optical source, the second optical source, and the arrayed waveguide grating are provided.

26. The apparatus of claim 1, wherein the spectral multiplexer includes an arrayed waveguide grating.

* * * * *